(12) United States Patent
Chen

(10) Patent No.: US 11,110,774 B2
(45) Date of Patent: Sep. 7, 2021

(54) VEHICLE AIR-CONDITIONING DEVICE USING SEMICONDUCTOR AS COOLING CORE

(71) Applicant: Chuan-Sheng Chen, Taipei (TW)

(72) Inventor: Chuan-Sheng Chen, Taipei (TW)

( * ) Notice: Subject to any disclaimer, the term of this patent is extended or adjusted under 35 U.S.C. 154(b) by 360 days.

(21) Appl. No.: 16/182,632

(22) Filed: Nov. 7, 2018

(65) Prior Publication Data

US 2020/0039319 A1    Feb. 6, 2020

(30) Foreign Application Priority Data

Aug. 3, 2018    (TW) .................................. 107127027

(51) Int. Cl.
*B60H 1/00*    (2006.01)

(52) U.S. Cl.
CPC ................. *B60H 1/00478* (2013.01)

(58) Field of Classification Search
CPC .. B60H 1/00478; B60H 1/00457; B60H 1/32; B60H 1/00878; F25B 2321/0252; F25B 2321/023; F25B 2321/021; F25B 21/02
USPC .............................. 62/3.2, 3.3, 3.6, 3.61, 3.7
See application file for complete search history.

(56) References Cited

U.S. PATENT DOCUMENTS

| 3,324,667 | A | * | 6/1967 | Muller | ................... | H01L 35/30 |
| | | | | | | 62/3.6 |
| 9,097,446 | B2 | * | 8/2015 | Oh | ................... | B60H 1/00478 |
| 10,386,085 | B2 | * | 8/2019 | Chen | ................... | F24F 5/0042 |
| 2010/0031674 | A1 | * | 2/2010 | Aldrich | ................... | F25B 21/04 |
| | | | | | | 62/3.2 |
| 2015/0128614 | A1 | * | 5/2015 | Ghoshal | ................... | F24H 4/04 |
| | | | | | | 62/3.3 |
| 2017/0217284 | A1 | * | 8/2017 | Ji | ................... | B60H 1/00564 |

FOREIGN PATENT DOCUMENTS

JP    3211172 U    *    6/2017    ............ F24F 5/0042

* cited by examiner

*Primary Examiner* — Steve S Tanenbaum
(74) *Attorney, Agent, or Firm* — Leong C. Lei

(57) ABSTRACT

Disclosed is a vehicle air-conditioning device using semiconductor as a cooling core, including a thermoelectric cooling chip, a cooling circulator, a heat dissipation device, and a power-supplying and temperature-controlling device. The thermoelectric cooling chip has an electricity receiving end electrically connected to the power-supplying and temperature-controlling device to receive electricity therefrom to be energized as to have an end thereof forming a cold generating surface adjacent to the cooling circulator and an end opposite to the cold generating surface forming a heat generating surface adjacent to the heat dissipation device. The cooling circulator includes a tube-winding circulation box including temperature-reduction conducting fins distributed on a surface, a temperature-receiving water tank, a temperature-receiving conducting plate, a fan, and an assistive temperature transferring device including an electric water pump. The tube-winding circulation box is connected through piping to the temperature-receiving water tank that is stacked with the temperature-receiving conducting plate.

3 Claims, 5 Drawing Sheets

VEHICLE AIR-CONDITIONING DEVICE USING SEMICONDUCTOR AS COOLING CORE

TECHNICAL FIELD OF THE INVENTION

The present invention relates generally to a vehicle air-conditioning device that uses semiconductor as a cooling core, and more particularly to a novel temperature adjustable cold/heat exchanger structure, which is applicable to automobiles, by making use of the property of a thermoelectric cooling chip that causes heating at one end and cooling at an opposite end when working with a supply of electricity, in combination with a cooling circulator, a heat dissipation device, and a power-supplying and temperature-controlling device, wherein the cooling circulator is made up of a tube-winding circulation box having a surface on which heat transfer fins are distributed, a fan, and an assistive temperature transmission device having an electric water pump, for the purposes of improving a previous invention made by the inventor for better use in a vehicle air-conditioning device.

DESCRIPTION OF THE PRIOR ART

A known automobile cooling/heating device has a structure involving a known automobile air-conditioning circuit shown in FIG. 1, which uses a coolant and a compressor as a key of a cooling circulation to provide a function of cooling and air conditioning. The cooling air-conditioning piping circuit is formed by sequentially connecting, in a looped form, a coolant storage tank 1, an expansion valve 2, an evaporator 3, a compressor 4, and a condenser 5. The coolant is transferred from a high-pressure moderate-temperature liquid form through volume expansion to high-pressure moderate-temperature gaseous form, followed by evaporation into a low-pressure low-temperature liquid form to flow into the compressor 4. Being compressed by the compressor 4, a high-pressure high-temperature gaseous form is generated and supplied to the condenser 5, where condensation occurs for transfer back to the high-pressure moderate-temperature liquid form to return to the coolant storage tank 1. Such a circulation is repeated. During a coolant evaporation process, heat is absorbed and cooled airflow is generated and pumped into a vehicle interior to lower down the temperature in the vehicle interior. During a coolant condensation process, the high temperature of the vehicle interior is dissipated to the outside. Since the compressor 4 is bulky and heavy, an increased load is carried by the vehicle. In addition, the operation of the compressor 4 generates noises and consumes a large amount of electric power, so that the energy efficiency of the operation of the vehicle is indirectly lowered down. To ensure sufficient cold/heat exchange performance of a vehicle air-conditioning device, while making the air-conditioning structure light in weight so as to make the operation of the vehicle more energy economic is a goal that the inventor is pursuing.

The inventor has previously proposed a semiconductor based electric cooling/heating appliance, which was issued U.S. Pat. No. 7,251,943 in Aug. 7, 2007. Such a patent provides an appliance having a primitive simplified and effective structure arrangement; however, further improvement may be made in respect of cold/heat exchange circulation performance. Later, the inventor filed a patent application with Taiwan Patent Office, which is allocated No. 105122672, in Jul. 19, 2016. The Taiwan Patent Application discloses a cold/heat circulation machine using semiconductor as cooling core, which provides an enhanced cold/heat circulation mechanism and an improved heat exchange efficiency, and such an application is granted a Taiwan patent, of which specifics are provided in FIGS. 2 and 3 that respectively illustrate a circulation generated by such a device and a structural arrangement of the device. This device is an air conditioning apparatus that uses semiconductor as a cooling core and comprises at least one thermoelectric cooling chip 100, 101, a cooling circulator 200, a heat dissipation device 300, and a power-supplying and temperature-controlling device 500, wherein the thermoelectric cooling chips 100, 101, with an electricity receiving terminal thereof electrically connected to the power-supplying and temperature-controlling device 500 to receive electricity therefrom, have an end that forms a cold generating surface and an end opposite to the cold generating surface and forming a heat generating surface. The cold generating surface is set in tight engagement with the cooling circulator 200 and the heat generating surface in tight engagement with the heat dissipation device 300. The cooling circulator 200 and the heat dissipation device 300 are each made up of a tube-winding circulation box 203, 303 that includes heat transfer fins 201, 202, 301, 302 distributed on a surface thereof, a fan 205, 305, and an assistive temperature transferring device 400, 401 that is specifically provided with an electric water pump 402, 403 for speeding up a water flow. An interior chamber of the tube-winding circulation box 203, 303 receives and holds water therein. Temperature-receiving conducting plates 204, 304 are positioned, in tight engagement, on opposite surfaces of the thermoelectric cooling chip 100, 101. The fan 205, 305 is arranged around the heat transfer fins 201, 202, 301, 302. The electric water pump 402, 403 is arranged at a suitable location for causing circulation of a pumped flow through the tube-winding circulation box 203, 303. The power-supplying and temperature-controlling device 500 has an electricity supplying output terminal electrically connected to the thermoelectric cooling chip 100, 101 and an electricity input terminal connected to a power supply device. A control panel is provided thereon with a main control interface device 504 that includes a power-on switch 501, a temperature increasing/decreasing control switch 502, and a constant-temperature control switch 503 to provide or set a desired constant temperature or to provide control for temperature increasing or decreasing to thereby set up a cold/hot air-conditioning system that controls the degree of cold/hot air temperature exchange through the heat dissipation device and the cooling circulator, achieving forced increase of cold/heat circulation efficiency. Such a structure arrangement is workable for applications to building spaces and refrigerators that are generally immobile. However, for a sedan, such a structure is still bulky and heavy. Thus, further improvement is required in order to match the features of vehicles, so that, particularly, when a vehicle is moving, an airflow could automatically move into the engine compartment to provide a feature of heat dissipation from a passenger compartment through the engine compartment. In such a structure, the heat dissipation device 300 could be realized with an air-cooling arrangement in order to reduce loading of the vehicle and thus improve an energy efficiency of the vehicle.

SUMMARY OF THE INVENTION

In view of the problems that traditional vehicle air-conditioners include a compressor that is bulky and heavy, generates high noise, and consumes a large amount of electrical power, a previous version of this invention, which relates to a "cold/heat circulation machine using semicon-
} ductor as cooling core" is provided to ensure a sufficient cold/heat exchange circulation efficiency, but is not feasible for being directly used in an automobile, and a lighter and compact version of the structure is required for use with an automobile. Thus, the inventor has been further devoted in study and research to provide the invention as described and claimed herein.

Thus, this invention is made on the basis of the previous version and is further improved to suit the need of use with an automobile or a vehicle to thereby provide a vehicle air-conditioning device using semiconductor as a cooling core, which comprises at least one thermoelectric cooling chip, a cooling circulator, a heat dissipation device, and a power-supplying and temperature-controlling device, in which the thermoelectric cooling chip, which has a power receiving terminal electrically connected to the power-supplying and temperature-controlling device to receive electricity therefrom, has an end forming a cold generating surface and an end opposite to the cold generating surface and forming a heat generating surface. The cold generating surface is in close engagement with the cooling circulator, and the heat generating surface in close engagement with the heat dissipation device. The cooling circulator comprises a tube-winding circulation box having a surface on which temperature-reduction conducting fins are distributed, a temperature-receiving water tank, a temperature-receiving conducting plate, fans, and an assistive temperature transferring device that includes an electric water pump for speeding up a water flow. The temperature-receiving water tank that is connected through a circulation pipe to the tube-winding circulation box is stacked with a temperature-receiving conducting plate that is in tight engagement with the cold surface of the thermoelectric cooling chip. The fans are arranged in a peripheral area of the temperature-reduction conducting fins and the fans drive air inside a vehicle passenger compartment to circulate through the tube-winding circulation box in which the temperature-reduction conducting fins are arranged. The electric water pump is mounted to a suitable location of a pipe through which circulation of a pumped flow is made from the tube-winding circulation box back to the temperature-receiving water tank. The heat dissipation device comprises a heat-dissipating fan inside a vehicle engine compartment and an air filter screen in front of the heat-dissipating fan. The power-supplying and temperature-controlling device has a power-supplying output terminal electrically connected to the thermoelectric cooling chip and an electricity input terminal electrically connected to a vehicle power supply. A main control interface device includes a panel on which a power-on switch, a temperature increasing/decreasing control switch, and a constant-temperature control switch in order to provide or set a desired constant temperature or to provide control for temperature increasing or decreasing to thereby set up a cold/hot air-conditioning system that controls air temperature inside and/or outside a vehicle compartment by means of the heat dissipation device and the cooling circulator, whereby the previous version of invention made by the inventor can be further improved for better suiting as vehicle air-conditioning, without the drawbacks of the conventional vehicle air-conditioning system that relies on a compressor that is bulky and heavy, increases vehicle loading, generates noise, and causes deterioration of energy efficiency of vehicle operation, this being the primary objective of this invention.

Further, in the vehicle air-conditioning device using semiconductor as a cooling core according to the present invention, an internal wall of the temperature-receiving water tank on which the temperature-receiving conducting plate is stacked is provided with a temperature-reduction transfer bar comprising a bar body projecting and depending therefrom and carrying multiple rows of transfer plates arranged close to each other for extending and reaching into water contained in the temperature-receiving water tank so that in transmitting a low temperature generated by the cold generating surface of the thermoelectric cooling chips through the temperature-receiving conducting plate into the temperature-receiving water tank, the temperature-reduction transfer bar functions to expand a heat-transferring and temperature-reducing surface area for quickly lowing the temperature of water that flows from the tube-winding circulation box, through piping, back into the temperature-receiving water tank, to thereby make a cooling efficiency of a vehicle compartment faster, this being another objective of this invention.

Further, in the vehicle air-conditioning device using semiconductor as a cooling core according to the present invention, the temperature-receiving conducting plate comprise or is made of an aluminum alloy having excellent heat conductivity so as to effectively transmit the low temperature of the cold generating surface, this being a further objective of this invention.

Further, in the vehicle air-conditioning device using semiconductor as a cooling core according to the present invention, the fans that are arranged in the peripheral area of the temperature-reduction conducting fins of the tube-winding circulation box comprise cross-flow fans to expand a spatial range through which cooled air is blown into the vehicle compartment.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
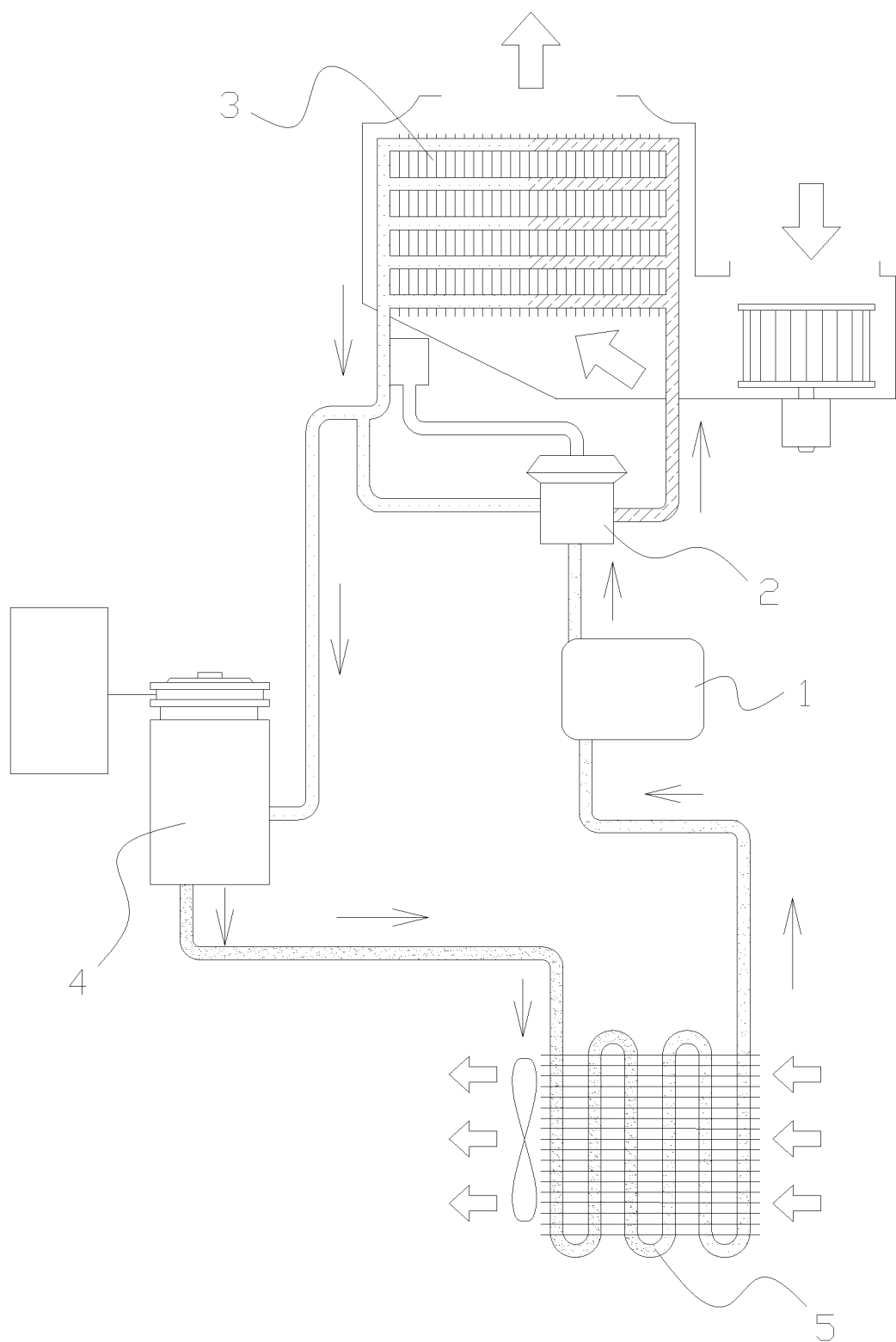
FIG. 1 is a conventional vehicle air-conditioning piping circuit.

FIG. 1 shows a conventional vehicle air-conditioning piping circuit, which involves a compressor that demonstrates a number of drawbacks.

Figure 2:
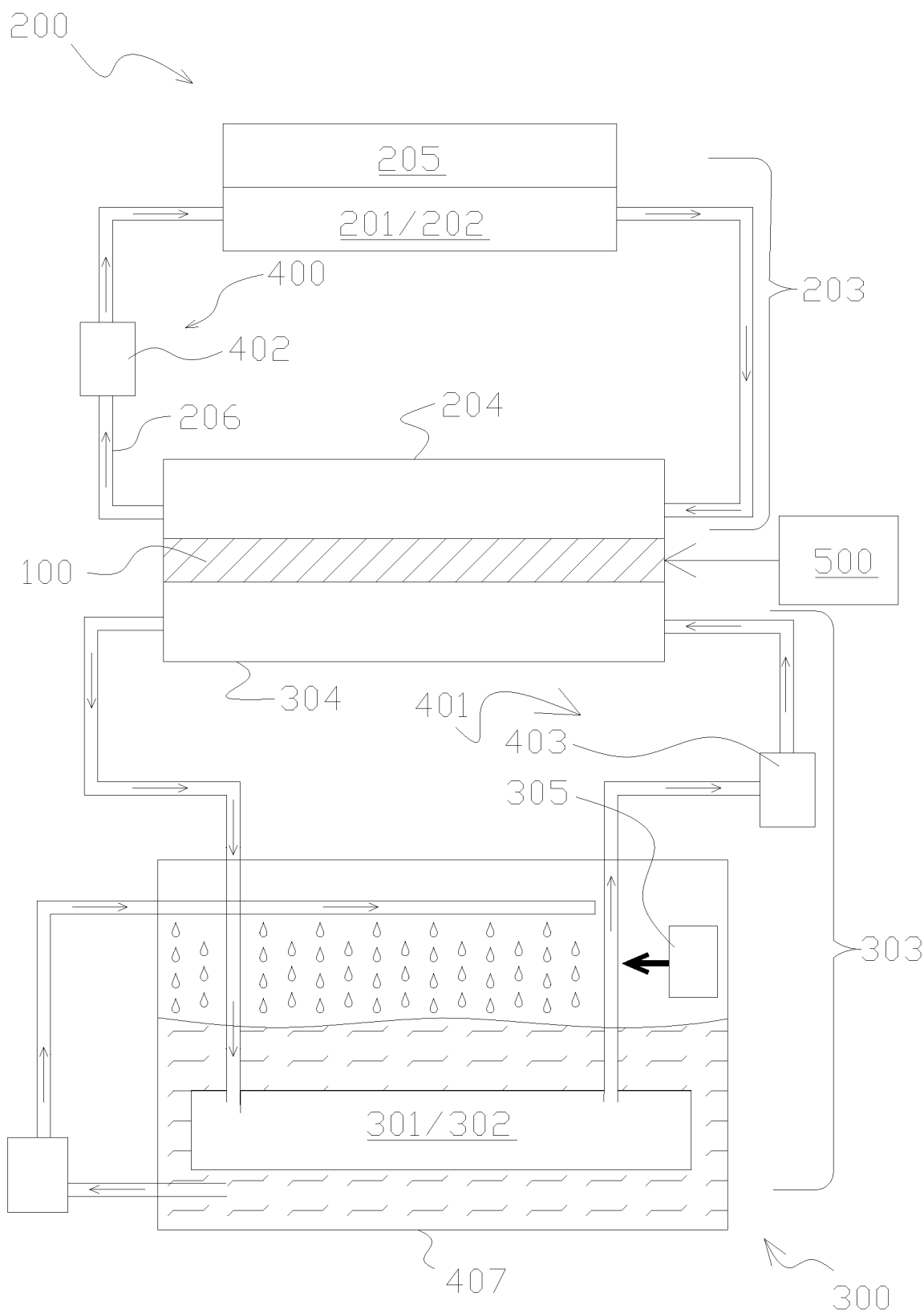
FIG. 2 is a diagram illustrating circulation generated in a cold/heat circulation device of a previous invention of the inventor that uses semiconductor as a cooling core.
Figure 3:
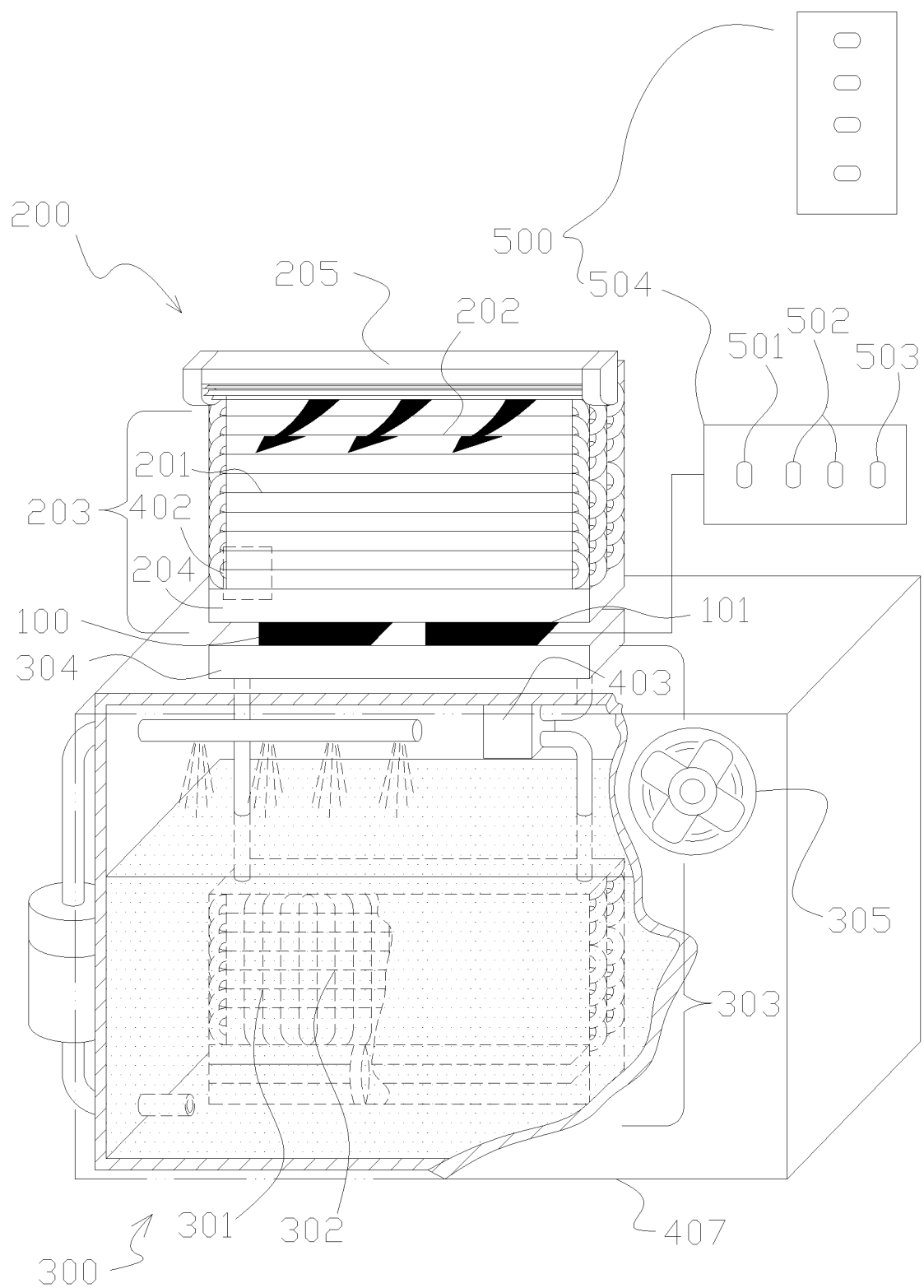
FIG. 3 is a diagram showing the cold/heat circulation device of the previous invention of the inventor that uses semiconductor as a cooling core.

FIGS. 2 and 3 provide a structure of a cold/heat circulation machine using semiconductor as a cooling core according to a previous invention of the inventor, of which drawbacks of being not light and compact has been discussed above, so that further discussion is not necessary here.

Figure 4:
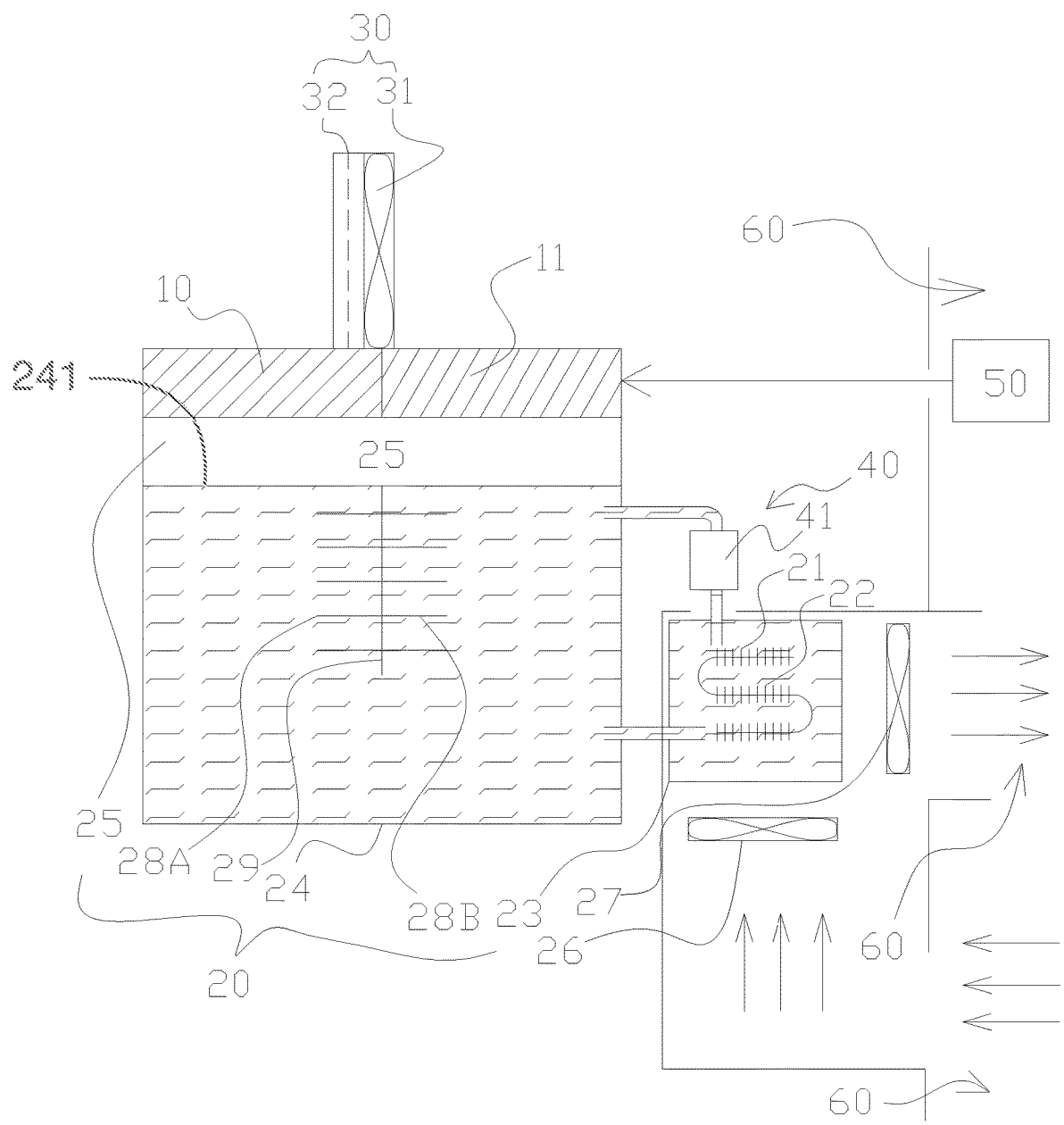
FIG. 4 is a diagram illustrating circulation generated in a vehicle air-conditioning device using semiconductor as a cooling core according to the present invention.
Figure 5:
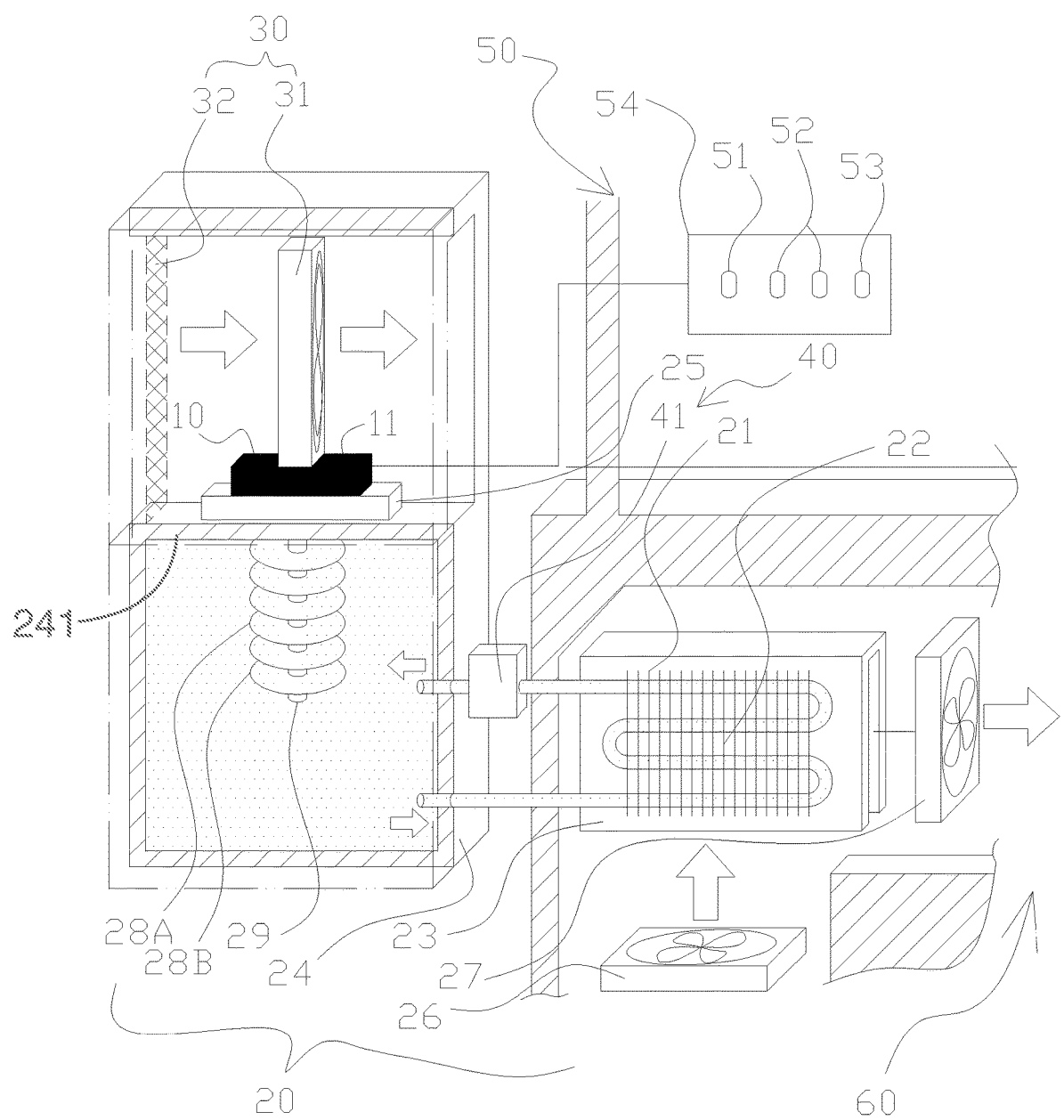
FIG. 5 is a diagram showing the vehicle air-conditioning device using semiconductor as a cooling core according to the present invention.

FIG. 4 is a diagram illustrating circulation generated in a vehicle air-conditioning device using semiconductor as a cooling core according to the present invention. Further reference being had to FIG. 5 showing the vehicle air-conditioning device according to the present invention, these drawings show that the vehicle air-conditioning device using semiconductor as a cooling core according to the present invention comprises at least one thermoelectric cooling chip 10, 11, a cooling circulator 20, a heat dissipation device 30, and a power-supplying and temperature-controlling device 50. The thermoelectric cooling chips 10, 11 have an electricity receiving end that is electrically connected to the power-supplying and temperature-controlling device 50 to receive electricity therefrom so as to be energized to generate a cold generating surface at one end thereof and also generating a heat generating surface at an end opposite to the cold generating surface. The cold generating surface is placed closely adjacent to the cooling circulator 20, and the heat generating surface is closely adjacent to the heat dissipation device 30. The cooling circulator 20 comprises a tube-winding circulation box 23 having temperature-reduction conducting fins 21, 22 completely distributed on a surface, a temperature-receiving water tank 24, a temperature-receiving conducting plate 25, fans 26, 27, and an assistive temperature transferring device 40 having an electric water pump 41 for increasing a speed of a water flow, wherein the temperature-receiving water tank 24 that is connected, through piping in a circulating manner, to the tube-winding circulation box 23 is stacked with the temperature-receiving conducting plate 25 in tight contact with the cold generating surface of the thermoelectric cooling chip 10, 11, and the fans 26, 27 are arranged on a peripheral area of the temperature-reduction conducting fins 21, 22. The fans 26, 27 drives air of a vehicle interior to move into and/or circulate through the tube-winding circulation box 23 that is internally provided with the temperature-reduction conducting fins 21, 22. The electric water pump 41 is mounted, at a predetermined or suitable location, to piping of the tube-winding circulation box 23 that circulates a pumped flow back to the temperature-receiving water tank 24. The heat dissipation device 30 is made up of a heat-dissipating fan 31 of or arranged in a vehicle engine compartment and an air filter screen 32 arranged frontward of the heat-dissipating fan, and as shown in FIG. 5, the heat-dissipating fan 31 is arranged upright and positioned close to or on the heat generating surface of the thermoelectric cooling chip 10, 11. The power-supplying and temperature-controlling device 50 has a power supplying output terminal that is electrically connected to the thermoelectric cooling chips 10, 11 and a power input terminal that is electrically connected to a vehicle power supply, and a main control interface device 54 is included, comprising a control panel that includes a power-on switch 51, a temperature increasing/decreasing control switch 52, and a constant-temperature control switch 53 arranged thereon in order to provide or set a desired constant temperature or to provide control for temperature increasing or decreasing to thereby set up a cold/hot air-conditioning system that controls air temperature inside and/or outside a vehicle compartment by means of the heat dissipation device and the cooling circulator. As shown in FIGS. 4 and 5, the fans 26, 27 drive air in the vehicle interior space 60 to circulate for temperature reduction. In addition, as an alternative, the power-on switch 51, the temperature increasing/decreasing control switch 52, and the constant-temperature control switch 53 of the power-supplying and temperature-controlling device 50 can be integrated with or simply serves as a temperature control/regulation operation interface of an air-conditioning dashboard arranged in the vehicle interior space 60, for providing an improved arrangement over the previous invention of the inventor for application in vehicles.

Further, in the vehicle air-conditioning device using semiconductor as a cooling core of this invention, an internal wall surface 241 of the temperature-receiving water tank 24 on which the temperature-receiving conducting plate 25 is stacked is additionally or alternatively provided with a temperature-reduction transfer bar 29 comprising a bar body projecting and depending therefrom and carrying multiple rows of transfer plates 28A, 28B arranged close to each other for extending and reaching into water contained in the temperature-receiving water tank 24 so that in transmitting a low temperature generated by the cold generating surface of the thermoelectric cooling chips 10, 11 through the temperature-receiving conducting plate 25 into the temperature-receiving water tank 24, the temperature-reduction transfer bar 29 functions to expand a heat-transferring and temperature-reducing surface area for quickly lowing the temperature of water that flows from the tube-winding circulation box 23, through piping, back into the temperature-receiving water tank 24. Further, the temperature-receiving conducting plate 25 may comprise or can be made of an aluminum alloy having excellent heat conductivity so as to effectively transmit the low temperature of the cold generating surface. The fans 26, 27 that are arranged in the peripheral area of the temperature-reduction conducting fins 21, 22 of the tube-winding circulation box 23 can be cross-flow fans or other types of fan so that the entire arrangement does not need a compressor that is commonly used in vehicle air conditioning system and has a large weight and may generate a large amount of noise. Thus, this invention helps improve, indirectly, an energy efficiency of vehicle operation and an effect of noise reduction in the operation of the air conditioning system may be achieved.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:
1. A vehicle air-conditioning device, comprising at least one thermoelectric cooling chip, a cooling circulator, a heat dissipation device, and a power-supplying and temperature-controlling device,
   wherein the at least one thermoelectric cooling chip has a cooling end and a heating end, the at least one thermoelectric cooling chip having an electricity receiving end electrically connected to the power-supplying and temperature-controlling device to receive electricity therefrom to be energized so as to have the cooling end forming a cold generating surface and the heating end that is opposite to the cold generating surface forming a heat generating surface, the cold generating surface being arranged adjacent to the cooling circulator, and the heat generating surface being adjacent to the heat dissipation device,
   wherein the cooling circulator comprises a tube-winding circulation box, a temperature-receiving water tank, a temperature-receiving conducting plate, a cooling-side fan, and an assistive temperature transferring device, wherein the tube-winding circulation box has a surface on which temperature-reduction conducting fins are distributed and the assistive temperature transferring device comprises an electric water pump, wherein the temperature-receiving water tank is connected, through piping in a circulating manner, to the tube-winding circulation box and the temperature-receiving water tank is stacked under the cold generating surface of the at least one thermoelectric cooling chip in such a way that the temperature-receiving conducting plate is stacked between the temperature-receiving water tank and the cold generating surface of the at least one thermoelectric cooling chip and is in direct contact with the temperature-receiving water tank and the cold generating surface of the at least one thermoelectric cooling chip, and wherein the cooling-side fan is arranged on a peripheral area of the temperature-reduction conducting fins, such that the cooling-side fan drives air toward a vehicle interior by having the air flowing and circulating through the tube-winding circulation box that is internally provided with the temperature-reduction conducting fins, and wherein the electric water pump is mounted, at a predetermined location, to piping of the tube-winding circulation box that circulates a pumped flow back to the temperature-receiving water tank;
   wherein the heat dissipation device comprises a heat-dissipating fan arranged in an engine compartment of a vehicle and arranged adjacent to or on the heat generating surface of the at least one thermoelectric chip and an air filter screen arranged frontward of the heat-dissipating fan, and the power-supplying and temperature-controlling device has a power supplying output terminal electrically connected to the thermoelectric cooling chip and a power input terminal electrically connected to a power supply of the vehicle, a main control interface device comprising a panel on which a power-on switch, a temperature increasing/decreasing control switch, and a constant-temperature control switch are provided for setting a predetermined fixed temperature or for controlling increasing and decreasing of temperature to thereby achieve a predetermined temperature inside a vehicle compartment through the heat dissipation device and the cooling circulator;
   wherein the temperature-receiving water tank is in direct contact with the temperature-receiving conducting plate that is in turn in direct contact with the cold generating surface of the at least one thermoelectric cooling chip such that heat is transferred between the temperature-receiving water tank and the cold generating surface of the at least one thermoelectric cooling chip by means of heat conduction through the temperature-receiving conducting plate.

2. The vehicle air-conditioning device according to claim 1, wherein the temperature-receiving water tank has an internal wall surface that is provided with a temperature-reduction transfer bar comprising a bar body projecting and depending therefrom, the temperature-reduction transfer bar comprising multiple rows of transfer plates arranged close to each other and extending and reaching into water contained in the temperature-receiving water tank.

3. The vehicle air-conditioning device according to claim 1, wherein the cooling-side fan comprises a cross flow fan.

* * * * *